United States Patent [19]
Shields et al.

[11] Patent Number: 4,547,117
[45] Date of Patent: Oct. 15, 1985

[54] NUCLEAR FUEL ROD BUNDLE DRIVE APPARATUS

[75] Inventors: Edward P. Shields; Elmer A. Bassler, Jr., both of North Huntingdon, Pa.

[73] Assignee: Westinghouse Electric Corp., Pittsburgh, Pa.

[21] Appl. No.: 535,082

[22] Filed: Sep. 23, 1983

[51] Int. Cl.⁴ ............................................. G21C 19/36
[52] U.S. Cl. .................................... 414/404; 376/272; 414/416; 414/745
[58] Field of Search ............... 414/146, 403, 404, 416, 414/417, 28, 43, 745, 746; 376/272; 29/400 N, 723 N

[56] References Cited

U.S. PATENT DOCUMENTS

4,441,242 4/1984 Hicken et al. ................. 376/272 X
4,446,098 5/1984 Pomaibo et al. ............... 376/272 X Primary Examiner—Robert G. Sheridan
Attorney, Agent, or Firm—L. A. DePaul

[57] ABSTRACT

Nuclear fuel rod bundle transferring apparatus is disclosed for transferring a bundle of the rods along a path from a first container to a second container. The apparatus includes a set of rollers mounted to permit the distance between the axes of the rollers to be varied from a first distance sufficient to receive the bundle of fuel rods to a second distance less than said first distance, wherein the rollers engage opposing sides of the bundle of nuclear fuel rods. A hatch is disposable between a first position intercepting the path and retaining the bundle of fuel rods within the first container, and a second position permitting the bundle of nuclear fuel rods to be transferred from the first container to the second container.

12 Claims, 18 Drawing Figures

NUCLEAR FUEL ROD BUNDLE DRIVE APPARATUS

CROSS-REFERENCE TO RELATED APPLICATIONS

This application is related to co-pending U.S. application Ser. No. 268,225 filed on May 28, 1981, now U.S. Pat. No. 4,446,098.

BACKGROUND OF THE INVENTION

This invention relates to storage of nuclear fuel rods and more particularly to the consolidation and storage of spent nuclear fuel rods.

After a period of operation of a nuclear reactor, the fuel rod assemblies comprising the core of the nuclear reactor must be rearranged with the depleted or spent fuel assemblies being replaced with fresh ones. The spent fuel assemblies are removed from the reactor vessel and generally stored in a pool of water on the reactor site. Since a conventional fuel assembly comprises structures other than fuel rods such as grids and control rod guide tubes, a spent fuel rod assembly occupies more space in the storage pool than would be required for the individual fuel rods. Because the storage pool has a finite volume, it is desirable to store the fuel rods in a closely packed array and with a minimum of support structure to thereby maximize the amount of spent nuclear fuel that can be stored in a given volume of the storage pool. Increasing the fuel rod packing density increases the available storage capacity for the spent fuel rods until the fuel rods are transported off the reactor site for storage or reprocessing.

However, since the spent fuel rods have been irradiated during reactor operation, they are highly radioactive and can be handled only by remote manipulators and while the fuel rods are submerged in a coolant. The radioactive nature of the spent fuel rod assemblies increases the difficulty of not only transporting the spent fuel rod assembly but of also dismantling the fuel rod assembly and storing the spent fuel rods.

Figure 1A:
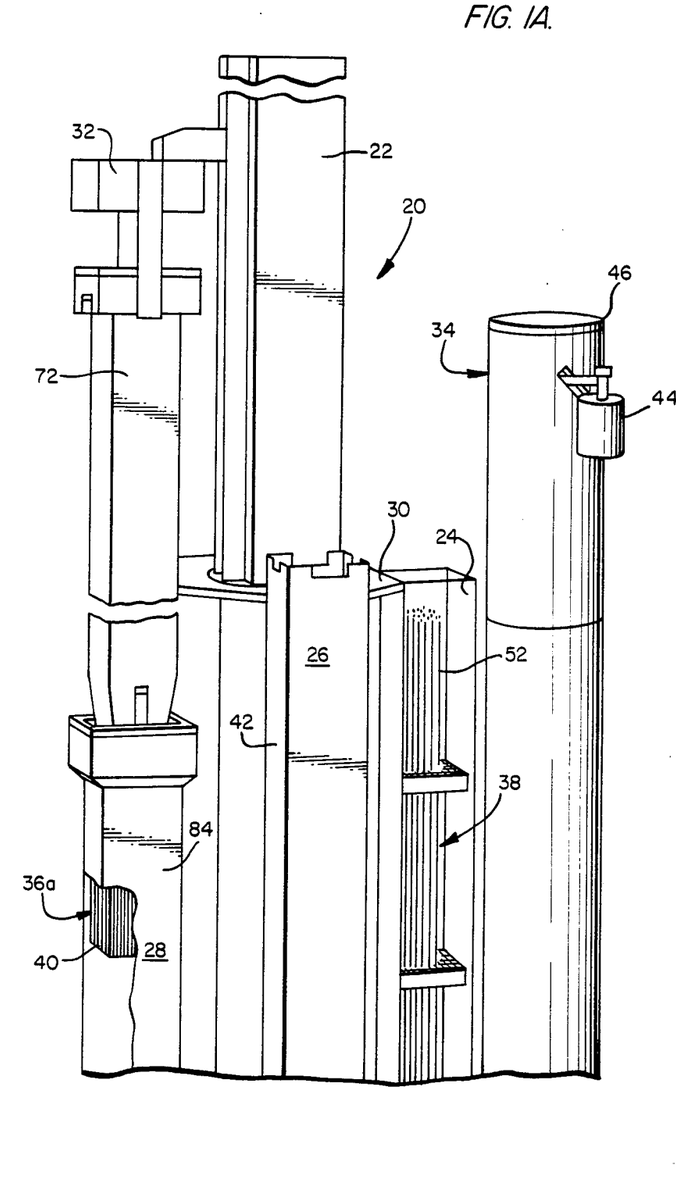
FIGS. 1A is a perspective view of the spent fuel consolidation system as disclosed in the above-identified application.

In the above-identified co-pending application, there is described a spent fuel consolidation system for remotely dismantling a spent nuclear fuel rod assembly and removing its fuel rods, while the fuel rod assembly remains submerged in a coolant, and for consolidating the spent fuel rods into a compact array for more dense storage in the storage pool. Referring to FIG. 1A, the spent fuel rod consolidation system, as described in the above-identified application, comprises a rotatable platform 20 that is capable of rotating about its vertical axis under the influence of a drive system (not shown) and that is capable of operating while completely submerged in the storage pool. Platform 20 comprises a vertical support 22, a fuel assembly station 24, a consolidation station 26 and a storage can station 28. Fuel assembly station 24, consolidation station 26, and storage can station 28 are attached to support plate 30 which is rotatably attached to vertical support 22. Support plate 30 is arranged such that when it is rotated about vertical support 22, fuel assembly station 24, consolidation station 26 and storage can station 28 may be selectively positioned with respect to gripper mechanism 32 which is slidably mounted on vertical support 22. A nozzle removal mechanism 34 is also arranged near platform 20 for removing a top nozzle (not shown) from fuel assembly 38. In an illustrative embodiment of this invention, the fuel rod assembly 38 may take the form of that assembly manufactured by Babcock and Wilcox comprised of an array of 15×15 rods including 208 fuel rods, 16 guide thimble tubes and a centrally located instrumentation tube. Alternatively, the fuel assembly 38 may be one as described in U.S. Pat. No. 3,791,466 issued Feb. 12, 1974 in the name of J. F. Patterson et al.

In general, fuel assembly station 24 provides a station for holding the spent fuel assembly 38 while its top nozzle and spent fuel rods 40 are removed therefrom. The fuel rods 40 are generally cylindrical metallic tubes containing nuclear fuel as is well understood in the art. Consolidation station 26 supports a transition canister 72, which provides a mechanism for rearranging fuel rods 40 into closely packed configurations. Storage can station 28 provides a station for locating a storage can 84 for accepting and holding fuel rods 40 after fuel rods 40 have been consolidated by the transition canister 72.

The nozzle removal mechanism 34 comprises an internal cutter mechanism 44 that is slidably mounted on positioning mechanism 46. Positioning mechanism 46 serves to position internal cutter mechanism 44 over the fuel assembly 38 originally disposed at the fuel assembly station 24. Since the typical fuel assembly 38 comprises a top nozzle (not shown) which is attached to a plurality of control rod guide tubes 52, it is necessary to cut control rod guide tubes 52 so that the upper portion of control rod guide tubes 52 and the top nozzle may be removed to expose the top ends of the spent fuel rods 40. Positioning mechanism 46 then removes the internal cutter mechanism 44 from the top nozzle.

Next, the internal cutter mechanism 44 is moved away from the fuel assembly station 24 and the gripper mechanism 32 is moved downwardly along vertical member 22 and into contact with the exposed fuel rods 40 of fuel assembly 38. Gripper mechanism 32 then grips each fuel rod 40 as previously described. With gripper mechanism 32 gripping each fuel rod 40, gripper mechanism 32 is moved upwardly along vertical support 22. Since the fuel rod assembly 38 is locked to the fuel assembly station 24, the upward pulling of fuel rods 40 by gripper mechanism 32 removes the fuel rods 40 from the remainder of the fuel rod assembly 38. In this manner, the fuel rods 40 can be removed from the remainder of the fuel assembly 38.

With the gripper mechanism 32 in its uppermost position, platform 20 may be rotated which will cause consolidation station 26 to be positioned under the gripper mechanism 32 and the fuel rods 40. Next, the gripper mechanism 32 is lowered along vertical support 22 so that the fuel rods 40 are inserted into the transition canister 72 originally disposed at the consolidation station 26. The transition canister 72 rearranges the fuel rods 40 as fuel rods 40 are lowered into transition canister 72 thereby closely packing fuel rods 40. When the gripper mechanism 32 has reached its lowermost position, the gripper mechanism 32 releases the fuel rods 40 so that the fuel rods 40 are completely contained in the transition canister 72. Next, the gripper mechanism 32 by means of a conventional gripper (not shown), is caused to grip transition canister 72. While holding the transition canister 72, the gripper mechanism 32 is again raised along the vertical support 22 until the transition canister 72 with the fuel rods 40 therein is raised clear of the consolidation station 26. With the transition canister 72 lifted clear of the consolidation station 26, the platform 20 is again rotated until the storage can station 28 is located under the transition canister 72, as shown in FIG. 1A. When the transition canister 72 is over the storage can station 28, the gripper mechanism 32 is lowered thereby positioning the transition canister 72 on the storage can 84 disposed at the top of storage can station 28. With the transition canister 72 positioned on the storage can 84, the bottom end of the transition canister 72 is remotely opened and the fuel rods 40 disposed into the storage can 84 in a densely packed array or bundle. As shown in FIG. 8C, each storage can 84 may be arranged with a divider so that each storage can 84 can hold more than one set of the consolidated fuel rods 40. Once the fuel rods 40 have been deposited in the storage can 84, transition canister 72 may be returned to the consolidation station 26 by lifting the transition canister 72 and rotating the platform 20 in a reverse direction.

The storage can 84 is the permanent storage depository for one or more bundles of nuclear fuel rods 40. The closely packed bundle of fuel rods 40 needs to be carefully transferred from the transition canister 72 to the storage can 84. Accidental or rough handling of the fuel rods 40 may cause damage thereto and possible release of the nuclear materials contained therein. The release of such nuclear materials could possibly contaminate the reactor site and the storage pool of water.

SUMMARY OF THE INVENTION

The nuclear fuel rod bundle drive apparatus drives the rods along a path from a first container to a second container. The second container is aligned with and disposed beneath the first container. The nuclear rod bundle transferring apparatus comprises two sets of rollers, each set mounted to permit the distance between the axes of the rollers to be varied from a first distance, wherein space between the rollers is sufficient for receiving the bundle of fuel rods, to a second distance, less than said first distance, wherein the rollers engage opposing sides of the bundle of nuclear fuel rods. A hatch is disposable between a first position intercepting the path and retaining the bundle of fuel rods within the first container, and a second position permitting the bundle of nuclear fuel rods to be transferred from the first container to the second container. A drive mechanism is coupled with each of the rollers for rotatably driving the rollers in opposite directions. A mechanism is provided for disposing the rollers the second distance apart to permit the rollers to engage and to be rotatably driven by the drive mechanism to move the bundle of nuclear fuel rods from the first container to the second container.

BRIEF DESCRIPTION OF THE DRAWINGS

While the specification concludes with claims particularly pointing out and distinctly claiming the subject matter of this invention, it is believed that this invention will be better understood from the following description taken in conjunction with the accompanying drawings, wherein:

DESCRIPTION OF THE PREFERRED EMBODIMENT

Figures 1B, 1C, 1D, 1E, 1F:
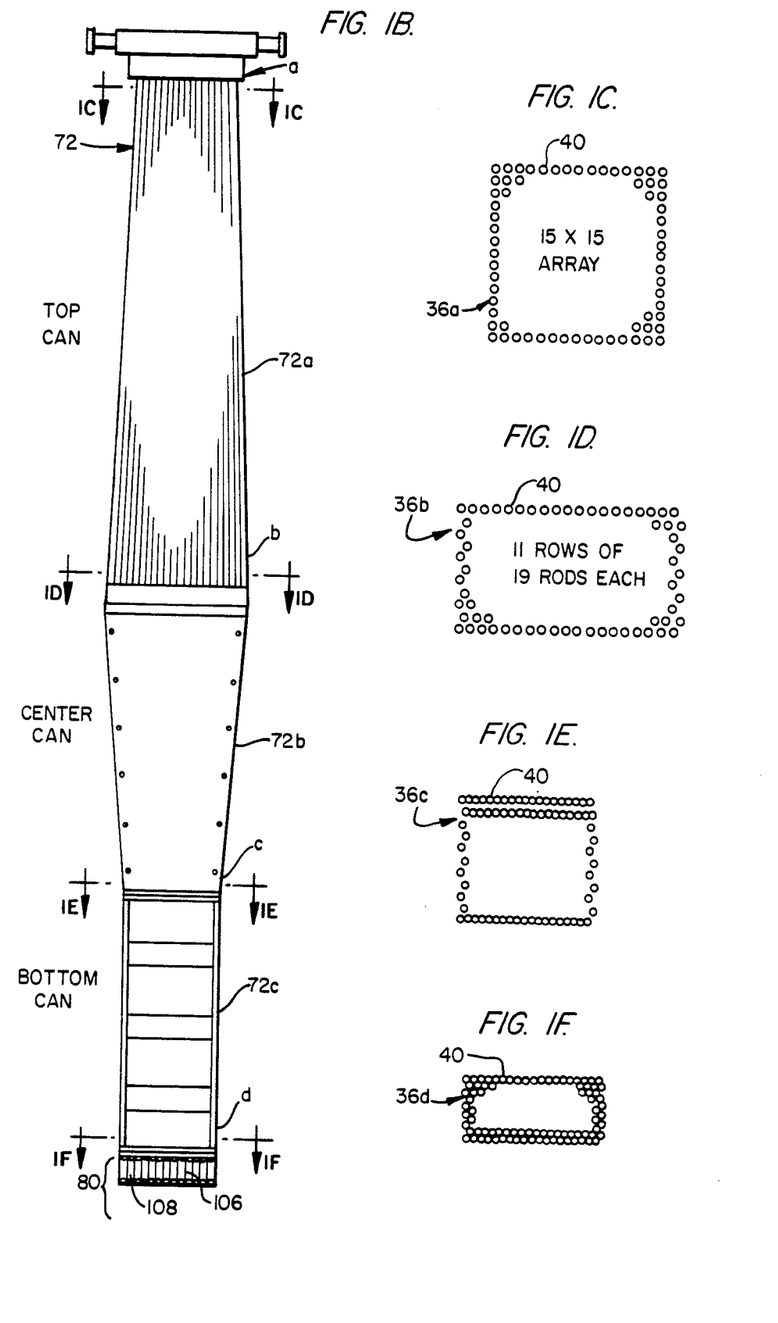
FIG. 1B is a side view of the transition canister.
FIGS. 1C to 1F are respectively cross-sections of a bundle of nuclear fuel rods as the bundle is successively reconfigured at points a, b, c and d, respectively along the length of the transition canister.

Referring now to the drawings and, in particular, to FIG. 1B, there is shown a side view of the transition canister 72, as more generally shown in FIG. 1A. The transition canister 72 includes a top can 72a, a center can 72b, and a bottom can 72c. A fuel rod bundle drive mechanism 80, in accordance with the teachings of this invention, is generally illustrated as being attached at the bottom of the transition canister 72 and, in particular, at the bottom of the bottom can 72c. The bundle 36 of nuclear fuel rods 40 is lowered into the transition canister 72. The cross-section of the bundle 36a at point "a" of the transition canister 12 is substantially square, as shown in FIG. 1C. The transition canister 72 reconfigures the bundle 36 to those configurations, as shown in FIGS. 1D, 1E and 1F, corresponding respectively to the bundle configurations appearing at points b, c and d, as shown in FIG. 1B. In FIG. 1F, the bundle 36d is of a rectangular configuration having a relatively long, length dimension and a relatively short, side dimension. Along the length dimension, as shown in FIG. 1F, the nuclear fuel rods 40 are disposed in immediate contact with adjacent fuel rods 40. In an adjacent row of fuel rods 40, each fuel rod 40 fits into the indentation formed between abutting fuel rods 40. As a result, the fuel rods 40 disposed along the side dimension of the bundle 36d, are spaced from each other. The bundle 36d is an optimum, densely packed array of the fuel rods 40. As will be explained below, the bundle 36d of fuel rods 40 is directed by the fuel rod bundle drive mechanism 80 of this invention from the transition canister 72 into a storage can 84, maintaining the fuel rods 40 in the same densely packed bundle 36d. To this end, the nuclear fuel rod drive mechanism 80 includes a pair of drive rollers 106, one of which is illustrated in FIG. 1B, each drive roller 106 has a plurality of serrations for receiving and maintaining the relative positions of those fuel rods 40 as disposed along the length of the bundles 36d.

Figure 8A:
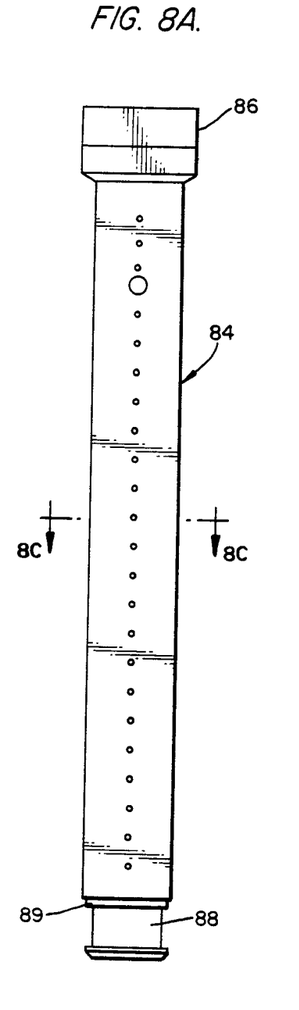
FIG. 8A is a side view of a storage can for receiving the bundle of nuclear fuel rods from the transition canister, as shown in FIGS. 1A and 1B.
Figure 8B:
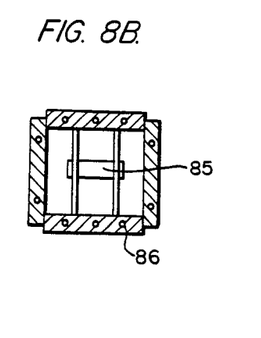
FIG. 8B is a plan view of the storage canister of FIG. 8A.
Figure 8C:
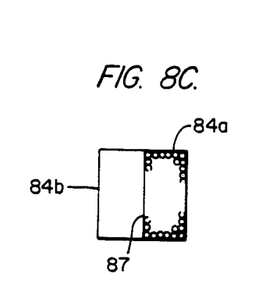
FIG. 8C is a sectioned view of the storage can as taken through lines 8C—8C of FIG. 8A.

Referring now to FIG. 8A, there is shown a side view of the storage can 84 for receiving the bundle 36d of nuclear fuel rods 40 from the fuel rod bundle drive mechanism 80. The storage can 84 is of a length corresponding to that of the nuclear fuel rods 40 and includes a bottom flow plate 89 against which the fuel rods 40 abut when inserted within the storage can 84. An energy absorber 88 is disposed against the bottom flow plate 89 to absorb the energy of the nuclear fuel rods 40 as they are disposed within the storage can 84, thus, minimizing possible damage to the nuclear fuel rods 40. As shown in FIG. 8B, the storage can 84 includes a lifting lug 85, whereby the storage can 84, after being filled with two bundles 36d of nuclear fuel rods 40, may be readily conveyed to its final storage location, e.g., a storage pool. As illustrated in FIG. 8C, the storage can 84 comprises two compartments 84a and 84b formed by a partitioning wall 87 disposed therebetween. As will be described below, a first bundle 36d will be inserted by the fuel rod drive mechanism 80 into the compartment 84a and, after repositioning the drive mechanism 80 with respect to the storage can 84, a second bundle 36d of nuclear fuel rods 40 will be loaded into the compartment 84b.

Figure 8D:
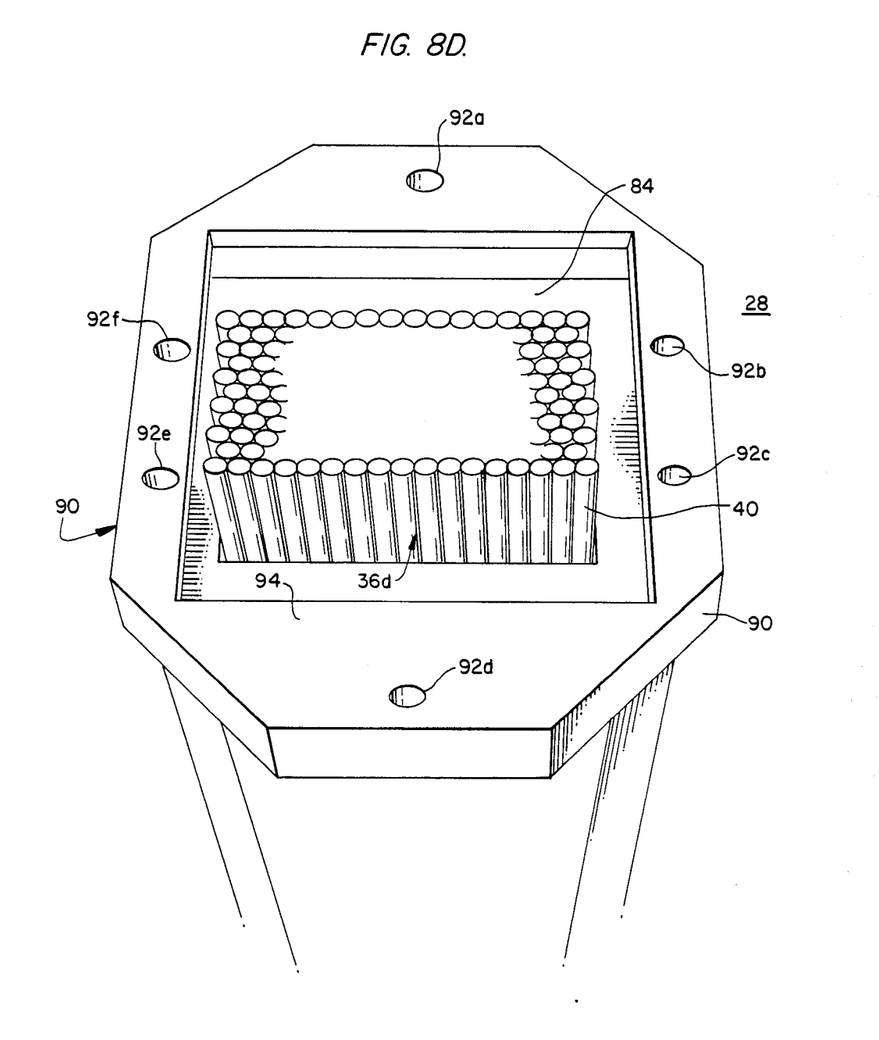
FIG. 8D is a perspective view of the storage can and the bundle of fuel rods contained therein as disposed within and supported by a temporary holding retainer.

The storage can 84 is disposed at the storage can station 28 and is supported there by a temporary holding retainer 90, as shown in FIG. 8D. The temporary holding retainer 90 provides the storage can station 28 for holding the storage can 84, while the fuel rod bundle drive mechanism 80 transfers the nuclear fuel rods 40 from the transition canister 72 into the storage can 84. It is understood that gripper mechanism 32 is necessary to position the transition canister 72 with respect to the temporary holding retainer 90 and, therefore, the storage can 84 held therein.

Figure 2:
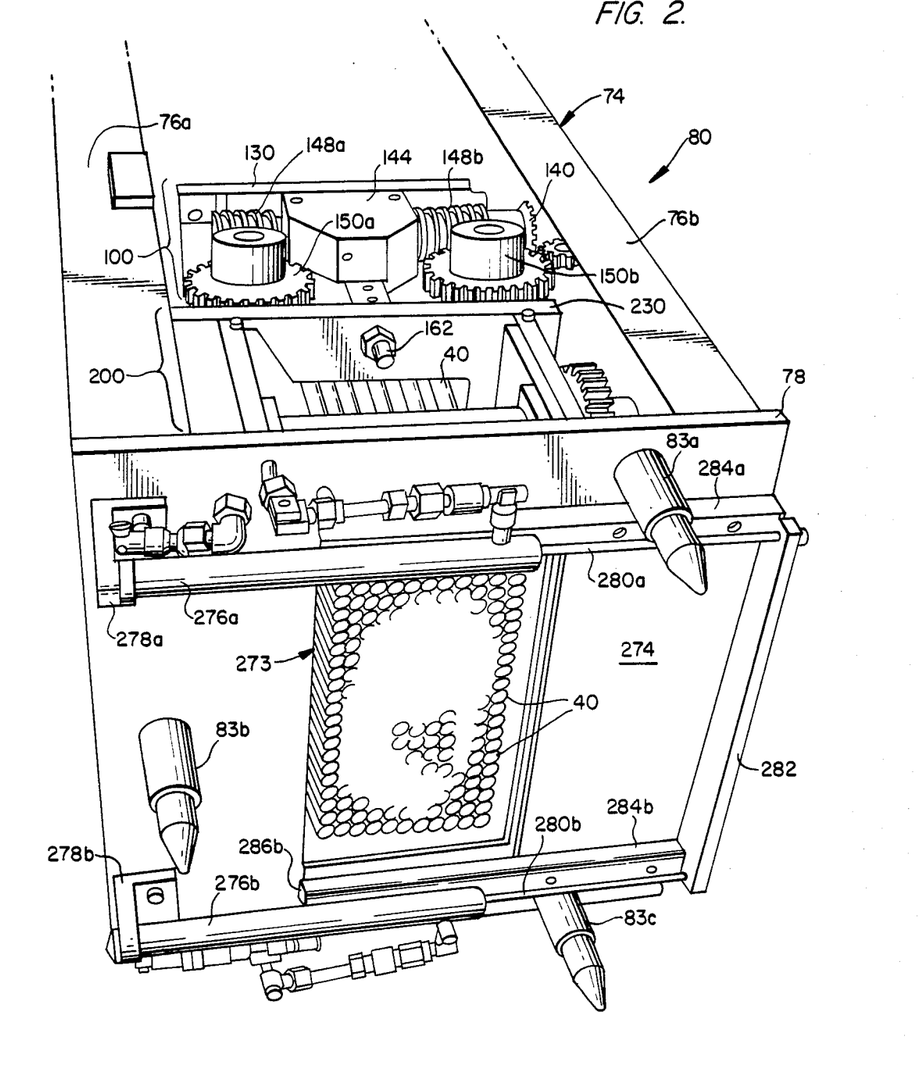
FIG. 2 is a perspective view of the fuel rod bundle drive mechanism particularly illustrating a bottom portion thereof and the discharge of spent fuel rods from a transition canister.
Figure 3:
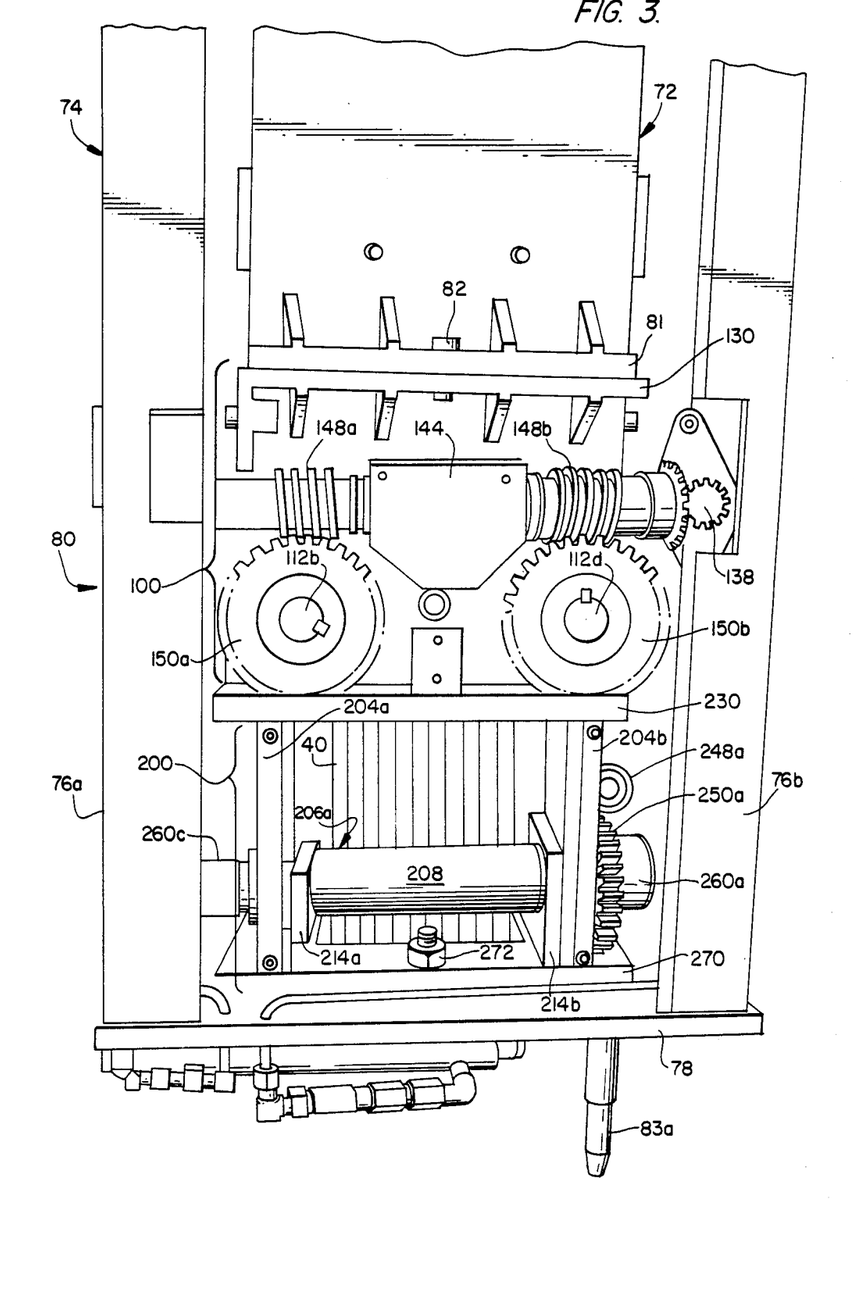
FIGS. 3 and 4 are respectively a side view and a perspective view of the fuel rod bundle drive mechanism as shown in FIGS. 2 and 1B.
Figure 4:
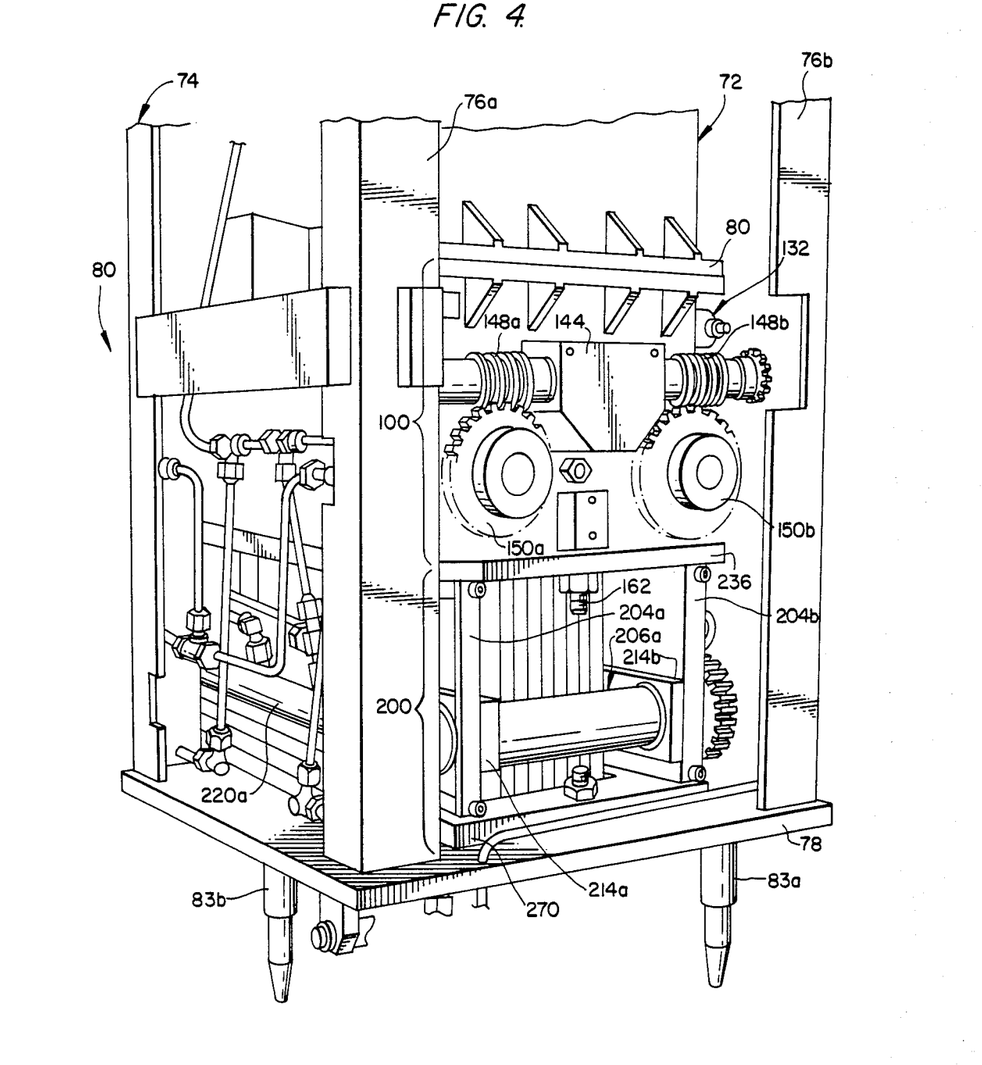

Referring now to FIGS. 2, 3 and 4, the details of the fuel rod bundle drive mechanism 80 are shown. The rod bundle drive mechanism 80 comprises an upper drive assembly 100, as will be explained in greater detail below with respect to FIGS. 5 and 6, and a lower drive assembly 200. The fuel rod bundle drive mechanism 80 is disposed beneath and is adapted to be secured to the transition canister 72. In particular, the upper drive assembly 100 of the mechanism 80 comprises a mounting plate 130 that abuts a bottom plate 81 of the transition canister 72 and is securely coupled thereto by a fastener in the form of a plurality of bolts 82, one of which is shown in FIG. 3. As particularly shown in FIGS. 2, 4 and 6, the upper drive assembly 100 includes at least two threaded, alignment pins 162 that are adapted to mate in openings of a mounting plate 230 of the lower drive assembly 200 and to be secured thereto by nuts.

Figure 5:
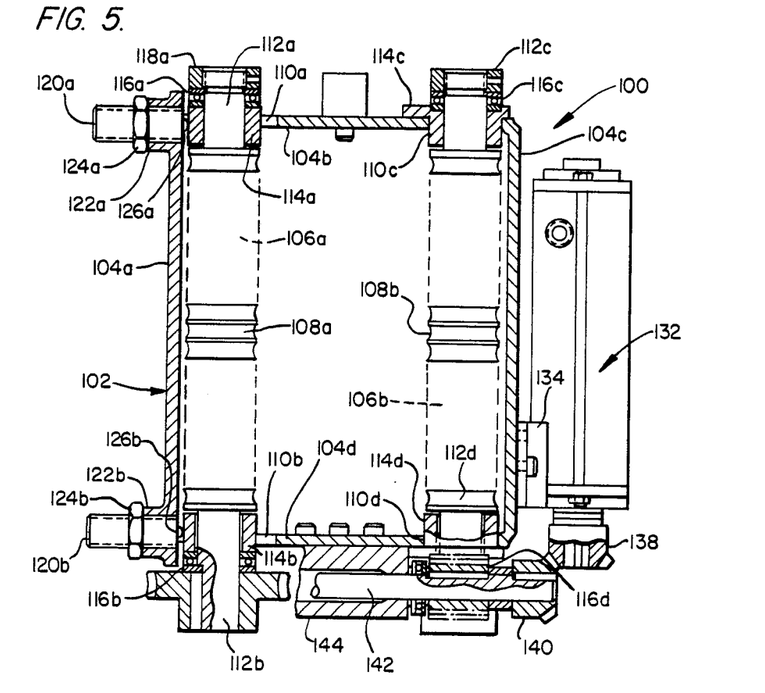
FIGS. 5 and 6 are respectively a partially sectioned, top plan view and a side view of the upper drive assembly of the fuel rod bundle drive mechanism of this invention.
Figure 6:
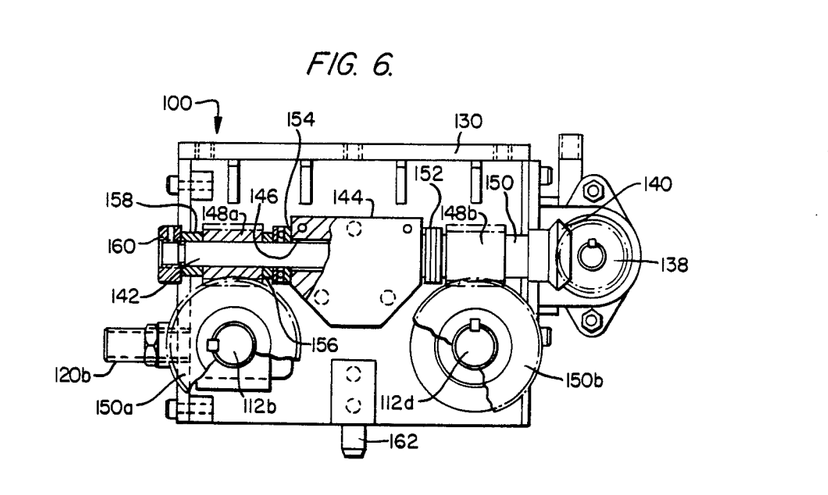

As illustrated in FIGS. 5 and 6, the upper drive assembly 100 includes the pair of drive rollers 106a and 106b that are rotatingly driven in opposite directions to drive the fuel rods 40 therebetween from the transition canister 72. As seen in FIG. 5, the pair of rollers 106a and 106b abut and drivingly engage the long dimension of the bundle 36d of fuel rods 40. As particularly illustrated in FIGS. 3 and 4, the lower drive assembly 200 includes a pair of rollers 208a and 208b (only roller 208a is shown) for abutting and drivingly engaging the short dimension of the bundle 36d of fuel rods 40. Each pair of rollers 106 and 206 is variably spaced from each other to permit each set of rollers to clamp the bundle of fuel rods 40, as will be explained below.

As shown particularly in FIG. 2, a hatch 274 is mounted to be driven from an open position, as shown in FIG. 2, to a closed position covering an opening 273 within a support plate 78 of a frame-like structure 74, thereby retaining the bundle of fuel rods 40 within the transition canister 72. The hatch 274 is driven between its open and closed positions by a pair of hydraulic drive cylinders 276a and 276b. The drive cylinders 276a and 276b are respectively mounted upon the support plate 78 by a pair of brackets 278a and 278b. The drive cylinders 276a and 276b respectively drive pistons 280a and 280b. The free end of each of the drive pistons 280a and 280b is coupled to an opposing end of a drive member 282. As seen in FIG. 2, the drive member 282 is attached to drive the hatch 274 rectilinearly between its open and closed positions. The hatch 274 is received within guide grooves 286a and 286b, respectively, of a pair of guide rails 284a and 284b, each of which is secured to the support plate 78. As a result, the guide rails 284a and 284b permit the rectilinear motion of the hatch along the bottom surface of the support plate 78.

As particularly illustrated in FIGS. 3 and 4, the transition canister 72 is adapted to be lowered onto the temporary holding retainer 90 and, in particular, the storage can 84 by the frame-like structure 74 comprised of the support plate 78 and four upright members 76a, 76b, 76c (not shown) and 76d. As particularly shown in FIG. 2, a plurality of aligning pins 83a, 83b and 83c project downwardly from the support plate 78 to facilitate alignment of the frame-like structure 74 with a like array of openings 92 within the temporary holding retainer 90. As shown in FIG. 8D, the temporary holding retainer includes a flange 94 having a plurality of openings 92a to 92f therein. As the frame-like structure 74 is lowered onto the temporary holding retainer 90, the three aligning pins 83a, 83b and 83c are inserted within a corresponding set of three openings 92, whereby the rod bundle drive mechanism 80 is aligned with one of the compartments of the storage can 84. After that compartment is filled with fuel rods 40, the frame-like structure 74 is lifted from the temporary holding retainer 90, repositioned and again lowered onto the temporary holding retainer 90. In the second position, the aligning pins 83a, 83b and 83c are disposed within other of the openings 92, whereby the rod bundle drive mechanism 80 is aligned to transport the nuclear fuel rods 40 of the compacted bundle 36d into the second compartment of the storage can 84. After the storage can 84 has been filled with nuclear fuel rods, the storage can 84 is removed from the temporary holding retainer 90 and disposed within the final storage location, e.g., a storage pool located at the reactor site.

Referring now to FIGS. 5 and 6, a more detailed explanation of the upper drive assembly 100 will be provided. The upper drive assembly 100 comprises the pair of rollers 106a and 106b mounted within a rectangularly-shaped frame 102 comprised of four side panels 104a, 104b, 104c and 104d. The drive roller 106a has a pair of end shafts 112a and 112b axially extending from either end thereof, whereas the drive roller 106b has a pair of end shafts 112c and 112d axially extending from either end thereof. The end shafts 112c and 112d are rotatively received within a pair of corresponding bearings 114c and 114d. The bearings 114c and 114d are disposed respectively within the side panels 104b and 104d. As illustrated in FIG. 5, the bearings 114c and 114d are fixedly disposed with respect to their side panels 104b and 104d to stationarily mount the roller 106b with respect to the bundle of fuel rods 40. By contrast, the end shafts 112a and 112b are rotatively mounted with a pair of corresponding sliding axial bearings 114a and 114b, which are disposed respectively within elongated slots 110a and 110b of the side panels 104b and 104d, respectively, to permit rectilinear motion of the drive roller 106a with respect to the drive roller 106b. In other words, the spacing between the axes of the drive rollers 106a and 106b may be varied, whereby the bundle of fuel rods 40 may be engaged and released. In particular, a pair of drive cylinders 120a and 120b provide the mechanism for disposing the drive roller 106a towards the drive roller 106b, thereby bringing the drive rollers 106 into a driving engagement with the bundle of fuel rods 40. As particularly illustrated in FIG. 5, each of the drive cylinders 120a and 120b is mounted within a mounting lug 122a and 122b disposed on the side panel 104a. Jam nuts 124a and 124b are associated with corresponding drive cylinders 120a and 120b, whereby its position with respect to the sliding axial bearings 114a and 114b and, thus, the drive roller 106a, may be adjustably set. The drive cylinders 120a and 120b include drive members 126a and 126b, respectively, that abuts against a corresponding one of the sliding axial bearings 114a and 114b. Thus, when the hydraulic pressure is increased within the drive cylinders 120a and 120b, the drive members 126a and 126b and, thus, the corresponding sliding axial bearings 114a and 114b, are moved to the right, as shown in FIG. 5.

Referring to both of FIGS. 5 and 6, an explanation of the drive mechanism for the drive rollers 106a and 106b will be provided. A canned pneumatic motor 132 is mounted adjacent the side panel 104c. The canned pneumatic motor 132 rotatably drives a miter gear 138 which matingly engages a miter gear 140. The miter gear 140 is, in turn, fixedly coupled to a common drive shaft 142. The drive shaft 142 is disposed through an opening 146 within a bearing block 144, which is mounted upon the slide panel 104d. The common drive shaft 142 rotatably drives a pair of worms 148a and 148b. As particularly illustrated in FIG. 6, the worms 148a and 148b respectively engage and drive worm gears 150a and 150b. In turn, the worm gears 150a and 150b are fixedly coupled to the end shafts 112b and 112d of the drive rollers 106a and 106b, respectively. In this manner, the canned pneumatic motor 132 imparts a clockwise rotational drive via the worm gear 150a to the drive roller 106a, and a counterclockwise rotational drive via the worm gear 150b to the drive roller 106b.

As shown in FIG. 5, a thrust bearing 116a is disposed about the end shaft 112a of the drive roller 106a and a collar 118a is affixedly secured to the end of the end shaft 112a. A thrust bearing 116b is disposed between the sliding axial bearing 114b and the worm gear 150a. Similarly, a thrust bearing 116c is disposed about the shaft 112c and a collar 118c is affixed to the end shaft 112c of the drive roller 106b. A thrust bearing 116d is disposed between the bearing 114d and the worm gear 150b of the drive roller 106b. Further, each of the drive rollers 106a and 106b includes a plurality of serrations 108a and 108b for receiving therein the fuel rods 40. The radii of the serrations 108 are determined such that the fuel rods are aligned in contact with each other when disposed within the serrations 108 of the rollers 106.

As shown in FIG. 6, the drive shaft 142 is rotatably disposed within the bearing block 144. The miter gear 140 is affixedly attached to the left-hand end of the drive shaft 142, as shown in FIG. 6. Thereafter, a spacer 150 is disposed to position the worm 148b. A thrust bearing 152 separates the worm 148 from the bearing block 144. A thrust bearing 154 and a spacer 156 are disposed about the drive shaft 142 and between the bearing block 144 and the worm 148a. Finally, a spacer 158 is disposed about the drive shaft 142, as retained thereon by a collar 160 affixedly attached to the end of the drive shaft 142.

Figure 9A:
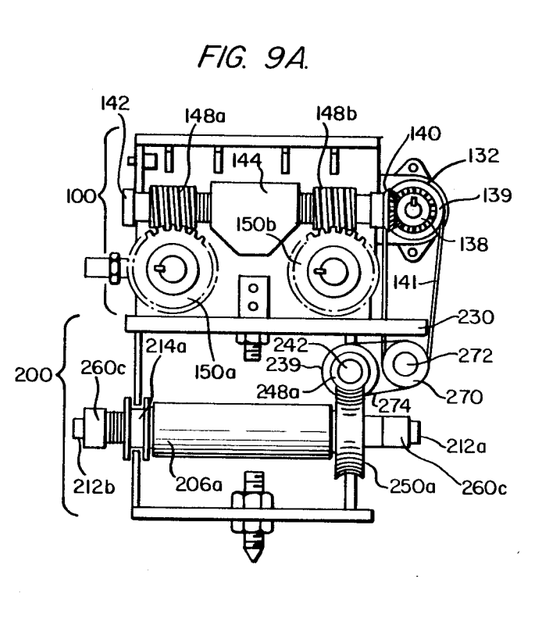
FIGS. 9A and 9B are respectively elevation views of the front and the side of the fuel rod bundle drive mechanism.
Figure 9B:
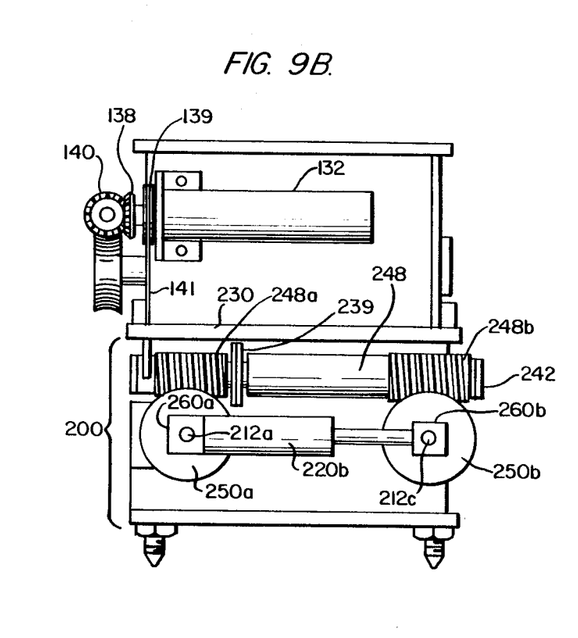

The lower drive assembly 200 will be more fully explained with respect to FIGS. 3 and 4. The lower drive assembly 200 is comprised of the upper mounting plate 230 and a lower mounting plate 270, between which is disposed a pair of side panels 204a and 204b. The side panels 204a and 204b receive the respective end shafts of the drive rollers 206a and 206b (not shown). Each of the drive rollers 206a and 206b is mounted in sliding bearings and receives a clamping force from a pair of contracting hydraulic cylinders 220a and 220b as coupled to the end shafts 212 of each of the drive rollers 206a and 206b. In particular, opposing end shafts 212a and 212b of the drive roller 206a are mounted within sliding axial bearings 214a and 214b, respectively. Further, that end shaft 212b of the drive roller 206a extending to the left, as seen in FIGS. 3 and 9A, is coupled to a coupling bearing 260c, which is in turn coupled to one end of the drive cylinder 220a, shown in FIG. 4. The other end of the drive cylinder 220a is coupled to a similar coupling bearing 260d (not shown) attached to the end shaft of the opposing drive roller 206b. As shown in FIG. 9B, a like drive cylinder 220b is coupled to the end shafts 212a and 212c of corresponding drive rollers 206a and 206b by a corresponding pair of coupling bearings 260a and 260b. When hydraulic pressure is applied to the drive cylinders 220a and 220b, the coupling bearings 260 and, thus, the drive rollers 206 are driven toward each other, whereby the bundle of fuel rods 40 is clamped therebetween.

Unlike the drive rollers 106a and 106b, the drive rollers 206a and 206b do not have serrations therein, but are provided with knurled surface 208 to enhance the friction between the drive rollers 206 and the fuel rods 40. The knurled surfaces 208 permit readjustment of the position of the fuel rods 40 with respect to each other. The drive rollers 206a and 206b provide dimensional support to the bundle of fuel rods 40 and a driving force to those fuel rods 40 disposed at the knurled sides of the drive rollers 200, which would otherwise tend to lag with respect to those fuel rods 40 driven by the drive rollers 106a and 106b, if the drive rollers 206a and 206b were not provided.

Referring now to FIGS. 9A and 9B, the drive rollers 208a and 208b are also driven by the canned pneumatic motor 132. The miter gear 138, driven by the canned pneumatic motor 132, includes a first sprocket 139 rotatively driving a drive chain 141. In turn, the drive chain 141 is coupled to an interconnecting drive mechanism comprised of a second sprocket 270 driven by the chain 141. In turn, the sprocket 270 is affixed to a drive shaft 272 which is, in turn, connected to a third sprocket (not shown in the drawings). The third sprocket is rotatably driven by the shaft 272. As shown in FIG. 9A, a second drive chain 274 serves to interconnect the rotational drive imparted to the third sprocket to a fourth sprocket 239, as shown in FIG. 9B, to rotatively drive a common drive shaft 242. A pair of worms 248a and 248b are rotatably driven by the common drive shaft 242 and, in turn, rotatably drive in opposite directions worm gears 250a and 250b. It is understood that the worm gears 250a and 250b respectively drive the drive rollers 206a and 206b.

Figure 7:
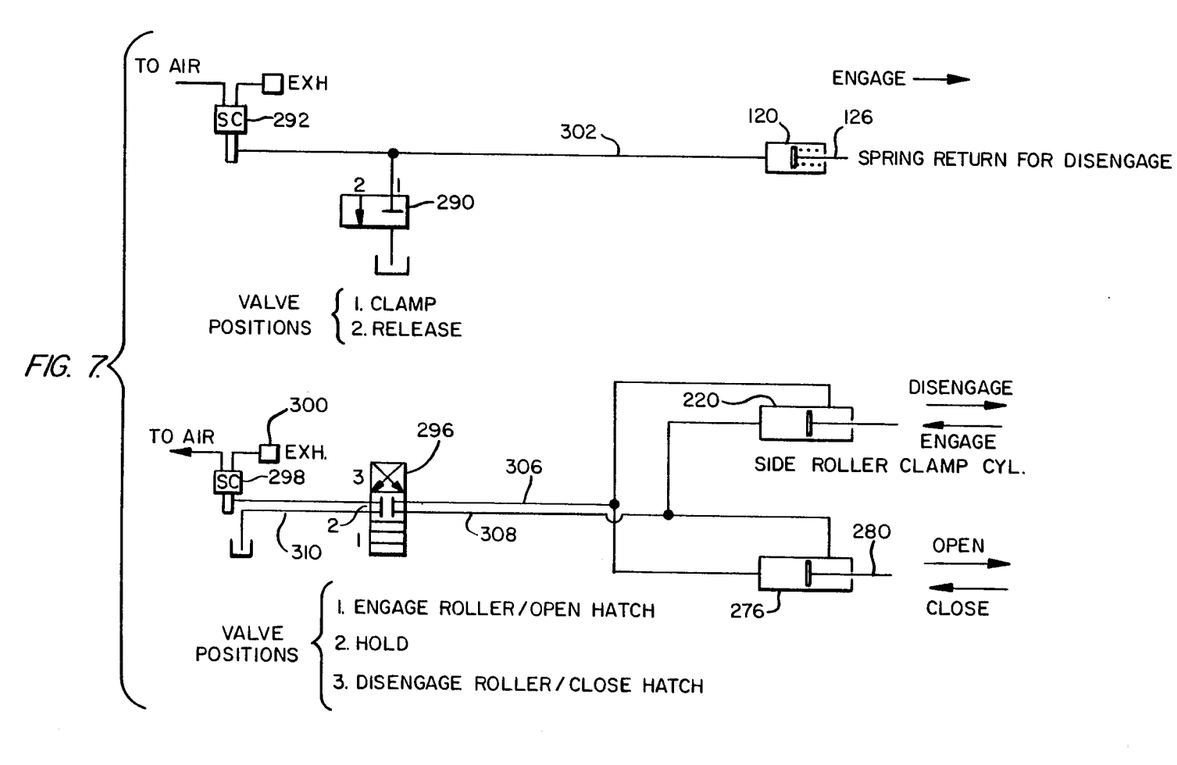
FIG. 7 is a circuit diagram of the hydraulic system for driving the hydraulic cylinders incorporated within the fuel rod bundle drive mechanism.

Referring now to FIG. 7, there is shown a hydraulic circuit for activating the drive cylinders 120. Though only one drive cylinder 120 is shown in FIG. 7, it is understood that two such drive cylinders, 120a and 120b, are disposed within the system, corresponding to the configuration shown in FIG. 5. In particular, a source of pressurized air is coupled by an hydraulic pump 292 via a conduit 302 to the drive cylinders 120. A valve 290 is disposed between a first clamping position and a second release position. In the clamping position, pressure is established through the conduit 302 to the drive cylinders 120, whereby their drive members 126 are driven to the right, as shown in FIGS. 7 and 5, to thereby dispose likewise the drive roller 106a to the right. Further, an air operated hydraulic pump 298 supplies hydraulic fluid via a conduit 304, a control valve 296 and a conduit 306 to the drive cylinders 220 and to the drive cylinders 276. Though only a single drive cylinder 276 is illustrated in FIG. 7, it is understood that two similar drive cylinders, 276a and 276b, are coupled to the hatch 274, as shown in FIG. 2. Likewise, though only a single drive cylinder 220 is illustrated in FIG. 7, it is understood that two similar drive cylinders 220a and 220b are coupled to move the drive rollers 206 together, as illustrated in FIGS. 4 and 9B. A return or exhaust is provided by conduits 308 and 310. The control valve 296 is operative in a first position wherein pressure is introduced to a first side of the cylinders 220 and 276, whereby the hatch 274 is disposed to its open position, as shown in FIG. 2, and the drive cylinders 220 serve to force together the rollers 206 coupled to opposite ends thereof. The control valve 296 has a second, hold position wherein pressure is maintained at an equilibrium within the cylinders 220 and 276. In the third position, pressure is provided to the other sides of the cylinders 220 and 276, whereby the hatch 274 is disposed to its closed position covering the opening 273, as shown in FIG. 2, and the drive cylinders 220 separate their drive rollers 206 to permit insertion of the bundle 36d of nuclear fuel rods 40 therebetween.

In summary, the frame-like structure 74 carrying the rod bundle drive mechanism 80 of this invention, is lowered onto the storage can 84. Once mounted, the rod bundle drive mechanism 80 is operated, as will be explained, to discharge the bundle of fuel rods 40 into the storage can 84. The aligning pins 83 are disposed into corresponding openings 92 of the temporary storage can 92, whereby the opening 273 within the support plate 78 is aligned with the storage can 84. When the frame-like structure 74 has been so aligned with the storage can 84, hydraulic pressure is applied to each of the drive cylinders 120a and 120b, whereby their drive members 126a and 126b are disposed in unison to the right, as shown in FIG. 5, whereby the drive roller 106a is likewise disposed to the right and the space between the drive rollers 106a and 106b is reduced. As a result, the drive rollers 106a and 106b are forced together to grip and to hold the fuel rod bundle 36d along the long dimension of the bundle 36d of fuel rods 40. Next, hydraulic pressure is applied at the same time to the set of drive cylinders 220a and 220b and to the set of drive cylinders 276a and 276b to clamp both of the drive rollers 206a and 206b towards each other, while disposing the hatch 274 from its closed position covering the opening 273 to its open position, as shown in FIG. 2. The hydraulic system of this invention is coupled in common to the drive cylinders 276a and 276b, and to the drive cylinders 220a and 220b, such that when the hatch 274 is closed, the drive rollers 206a and 206b are unclamped, and when the hatch 274 is opened, the drive rollers 206a and 206b are clamped together. After both sets of the drive rollers 106 and 208 have clamped the bundle of fuel rods, the canned pneumatic motor 132 is energized to drive both sets of the rollers 106 and 206. As explained above, the drive rollers 106a and 106b are driven in opposite directions as are drive rollers 206a and 206b, whereby the bundle of fuel rods 40 is driven downwardly, as shown in FIGS. 2, 3 and 4, into the storage can 84.

Therefore, the invention provides means for transferring the bundle of fuel rods for storage within the storage can.

We claim as our invention:

1. Apparatus for transferring a bundle of nuclear fuel rods along a path from a first container to a second container, the second container to be aligned with and disposed beneath the first container, said rod transferring apparatus disposed at the bottom of the first container, said rod transferring apparatus comprising:
    (a) a set of rollers, each roller having its axis, said rollers being mounted to permit the distance between the axes of the rollers to be varied from a first distance, whereat space between the rollers is sufficient for receiving the bundle of fuel rods to a second distance, less than said first distance, whereat said rollers engage opposing sides of the bundle of nuclear fuel rods;
    (b) a hatch disposable between a first position intercepting said path and retaining the bundle of fuel rods within the first container, and a second position permitting the bundle of nuclear fuel rods to be transferred from the first container to the second container;
    (c) drive means coupled with each of said set of rollers for rotatably driving said rollers in opposite directions;
    (d) actuatable means for disposing said hatch from its first position to its second position; and
    (e) actuatable means for disposing said rollers of said set said second distance apart to permit said rollers to engage and to be rotatably driven by said drive means to move the bundle of nuclear fuel rods from the first container to the second container.

2. The apparatus according to claim 1, wherein each of said set of rollers has a peripheral surface, said surface having a plurality of serrations therein, each serration being of a curvature corresponding to that of a nuclear filled rod, adjacent serrations spaced from each other such that the nuclear fuel rods of the bundle are packed in a dense bundle.

3. The apparatus as claimed in claim 1, wherein one of said set of rollers is fixedly mounted with respect to said path and another of said set of rollers is adjustably mounted with respect to said path to vary the spacing between said rollers of said set.

4. The apparatus as claimed in claim 3, wherein there is included a common drive shaft adapted to be rotatably driven by said drive means a set of worms rotatably driven by said common drive shaft and a set of worm gears engaging respective one said set of worms and fixedly coupled to corresponding ones of said set of rollers for imparting rotational motion in opposite directions thereto.

5. The apparatus as claimed in claim 1, wherein there is included a second set of rollers, each roller of said second set having its axis, said rollers of said second set being mounted to permit the distance between their axes to be varied from a first distance, whereat the space between said rollers of said second set is sufficient for receiving the bundle of fuel rods therebetween, and a second distance less than said first distance, whereat said rollers of said second set engage the opposing sides of the bundle of nuclear fuel rods.

6. The apparatus according to claim 5, wherein the bundle of nuclear fuel rods is configured as a rectangle, said axes of said first-mentioned set of rollers disposed substantially parallel with respect to each other, said axes of said second set of rollers disposed substantially parallel with each other and at right angles with said axes of said first-mentioned set of rollers, whereby said first-mentioned and said second sets of rollers maintain the nuclear fuel rods in a bundle of the rectangular configuration.

7. The apparatus as claimed in claim 6, wherein each of said second set of rollers is adjustably mounted with respect to said path.

8. The apparatus as claimed in claim 7, wherein there is included actuatable means coupled at one end to one roller of said second set and at its other end to another of said second set of rollers for adjustably disposing said rollers of said second set between said first distance and said second distances.

9. The apparatus as claimed in claim 5, wherein each roller of said second sets has a substantially cylindrical shaped peripheral surface, said peripheral surface being knurled to facilitate friction between said rollers of said set and the nuclear fuel rods of the bundle.

10. The apparatus as claimed in claim 5, wherein there is included drive coupling means coupled with said drive means and said second set of rollers for rotatably driving said rollers of said second set in opposite directions.

11. The apparatus as claimed in claim 10, wherein said coupling means comprises a common drive shaft, a set of worms each rotatably driven by said common drive shaft and a set of corresponding worm gears engaging respectively said worms of said set and fixedly coupled to said rollers of said second set respectively.

12. The apparatus according to claim 8, wherein said second roller disposing means is actuatable substantially simultaneous with the actuation of said hatch disposing means, whereby said hatch is disposed to its second position at substantially the same time that said rollers of said second set are spaced said second distance apart for rotatingly driving said second set of rollers as said hatch is opened.

* * * * *